(12) United States Patent
Sabeta

(10) Patent No.: US 7,623,295 B2
(45) Date of Patent: Nov. 24, 2009

(54) OPTICAL DEVICE CHARACTERIZATION

(76) Inventor: Anton Sabeta, 283 Danforth Ave, Suite 184, Toronto, Ontario (CA) M4K 1N2

( * ) Notice: Subject to any disclaimer, the term of this patent is extended or adjusted under 35 U.S.C. 154(b) by 259 days.

(21) Appl. No.: 11/562,981

(22) Filed: Nov. 22, 2006

(65) Prior Publication Data

US 2007/0274626 A1    Nov. 29, 2007

Related U.S. Application Data

(63) Continuation-in-part of application No. 11/379,218, filed on Apr. 18, 2006, and a continuation-in-part of application No. 11/419,978, filed on May 23, 2006, now Pat. No. 7,500,750.

(51) Int. Cl.
*G02B 25/00* (2006.01)
*G02C 7/02* (2006.01)

(52) U.S. Cl. ........................ 359/642; 351/159; 351/177

(58) Field of Classification Search .................. 359/642, 359/903; 707/E17.096; 351/159, 160 R, 351/177

See application file for complete search history.

(56) References Cited

U.S. PATENT DOCUMENTS

| 4,616,910 A | 10/1986 | Klein |
| 6,203,156 B1 | 6/2001 | Wu et al. |
| 2002/0003605 A1* | 1/2002 | Rogers et al. ............ 351/160 R |
| 2002/0174336 A1* | 11/2002 | Sakakibara et al. .......... 713/172 |

FOREIGN PATENT DOCUMENTS

JP    04011214 A2    1/1992

* cited by examiner

*Primary Examiner*—Scott J Sugarman
*Assistant Examiner*—James R Greece

(57) ABSTRACT

A method and system for determining the orientation of an optical device, the optical device having data carrier means for carrying data related to the optical device, the data carrier having data carrier means operable in at least one of an electrical mode and a magnetic mode; the data carrier means being associated with an optical device by at least at least one of the group of depositing on or printing on a posterior surface or anterior surface of the optical device, including the data carrier with the optical device material, wherein data carrier means emits a data signal periodically or in response to a external signal from an external means.

14 Claims, 8 Drawing Sheets

OPTICAL DEVICE CHARACTERIZATION

CROSS-REFERENCE TO RELATED APPLICATIONS

This application is a Continuation-in-Part of, and claims the benefit from U.S. application Ser. No. 11/379,218, filed on Apr. 18, 2006; and U.S. application Ser. No. 11/419,978 filed on May 23, 2006 now U.S. Pat. No. 7,500,750, the contents of each of which are incorporated herein by reference.

BACKGROUND OF THE INVENTION

1. Field of the Invention

The present invention relates to a method and system for associating an optical device with a data carrier, more particularly it relates to determining the characteristics of an optical device based on the information carried by the data carrier.

2. Description of the Prior Art

Optical components are items that are used to bend, split, diffuse, reflect or otherwise alter or refocus light wavelengths. These optical components are usually formed from a piece of shaped glass or plastic, among other materials. Optical light sources include astronomical objects, or devices that produce or radiate light when excited, such as, lasers, diodes, and lamps. The light produced can be in the visible range, the infrared range or ultraviolet ranges, of the electromagnetic spectrum.

One class of optical components is found in imaging systems, such as, a monocular, binoculars, telescopes, spotting scopes, telescopic gun sights, theodolites, microscopes, medical equipment, or cameras. Another class is directed towards ophthalmic devices for the correction of visual impairments such as myopia, hyperopia, presbyopia, and astigmatism. Such devices are typically corrective lenses, contact lenses, or eyeglasses.

The contact lens market in the United States is a multibillion dollar market. Recent data indicates that nearly 36 million Americans, almost 13% of the US population, wear contact lenses. There are numerous manufacturers of contact lenses and many different channels of distribution, including eye care practitioners (e.g., ophthalmologists and optometrists), national and regional optical chains, mass merchants, and mail order and online stores. The contact lenses include any of the following basic types: soft, rigid gas permeable and hard. Soft contact lenses are made of a highly flexible material such as a plastic hydrogel polymer, hydroxyethylmethacrylate (HEMA) that contains water or silicone or hydrophilic hydrogels. Rigid gas permeable contact lenses, frequently referred to as RGP contact lenses, are composed of a firm plastic material and do not contain water. RGP lenses permit oxygen to pass directly through the lens to the eye, thus these lenses are gas permeable. In contrast, hard contact lenses are made of a hard plastic material, such as polymethyl methylacrylate (PMMA), which does not allow oxygen to pass through the lens to the eye.

One issue facing lens wearers, eyecare practitioners, and the industry, has been the inability to readily distinguish between lenses intended for the left eye and/or the right eye. This is particularly relevant in such instances where the lenses are unwittingly mixed-up. Typically, mix-ups can occur at various stages, such as, during their manufacture, shipment or preparation in the office of a fitter, or by the user. To counter this problem, contact lenses are often manufactured with identifying marks, which have been hailed as being helpful in distinguishing between the right and left contact lenses. These marks include alphanumeric characters, such as serial numbers, lot and batch numbers, brand name, and optical powers, and may be located on the edge of the lens. However, these methods depend on the visual inspection of the lenses by the user in order to interpret the markings, which is not strictly useful for a user with already impaired vision, and thus may be undecipherable. The methods for providing identifying marks are well known, and include, using a laser, electrical discharge, machining, mechanical scribing, diamond scribing, ultrasonic scribing, holographic marking, and scattering by surface disruption. Also, these identification methods are manufacturing intensive, and require the use of expensive equipment.

Yet another problem facing users and the industry is the inability to readily determine which surface of the lens should be disposed against the eye. This problem has been further exacerbated by the development of newer polymers for soft contact lenses, in which the thickness of the lenses has been steadily reduced to the point where the lenses can easily end up being inside out, instead of right side out. In this orientation the lens can distort the optical properties of the lens, and may cause discomfort to the eye and in some instances can result in eye damage. Prior art methods to solve this problem, apart from using markings as described above, include recommendations to users to verify that the lens is not turned inside out by placing on their forefinger and checking its profile. In this method, it is stated that the lens should assume a natural, curved, bowl-like shape, however, if the lens edges tend to point outward, then the lens is inside out. Another method is to gently squeeze the lens between the thumb and forefinger, and if the lens is right side out then the edges should turn inward, otherwise the edges will turn slightly outward and the lens is thus inside out. It is clear that these methods are subjective, time-consuming, and may even be frustrating for a user, while still presenting a substantially low chance for correct lens orientation determination.

Further, certain types of defects in the eye can only be corrected by lenses which are not spherical. For instance, to effectively correct for astigmatism or presbyopia, the lens is manufactured so that it exhibits different optical properties at different portions thereof. As such, correction of astigmatism involves accurately aligning the principle power meridians of the lens with the principle refractive meridians in the eye, and maintaining the lens at a specific orientation with respect to the meridians of the eye. Misalignment errors will prevent proper correction of astigmatism. Such lenses include spherically asymmetrical lenses or toric lenses. One method for maintaining the lens in particular orientation involves constructing the lens with its intended bottom third thicker than its intended top two thirds, or the lens includes a relatively thick central zone and thinner top and bottom zones. However, because of irregularities in the shape of the cornea, interference by the lower lid, the lens does not stay in its preferred orientation, and may settle to a position that is rotated 5 or more degrees from its intended position. This rotation must be measured and taken into account in the cylinder portion of the lens prescription. One prior art method for measuring the rotation includes placing a trial lens on the eye of the patient and, with a slit lamp, projecting a narrow beam of light across the center of the patient's pupil and a reference point. The angle formed by the narrow light beam and the vertical is considered to be the rotation of the lens. However, such a method is uncomfortable for the user who is subjected to looking at the light, and decentralization of the pupil with respect to the center of the cornea, or of the lens with respect to the center of the cornea, or both can cause the measurement to be inaccurate.

In most countries, contact lenses are classified as medical devices, and are thus normally only dispensed with a valid prescription from a qualified eyecare practitioner. A valid prescription typically includes user's name, eye practitioner's name, contact lens brand name and material, lens measurements such as power, diameter and base curve, directions for safe use such as wearing schedule, whether lenses are for daily or extended wear, the number of refills, whether lens material substitutions are allowed and an expiration date. Generally, the quality of human vision worsens with age, or due to reasons independent of aging or eye diseases. Some of the changes in eyes are reduction in pupil size and the loss of accommodation or focusing capability, or presbyopia. As such, prescriptions typically have an expiration date, and thus should be updated periodically. Each lens manufacturer has a replacement schedule of a contact lens, that is, how long the lenses can be safely worn before discarding. The replacement schedule depends on the patient, manufacturer or the type of lens chosen.

For example, RGPs last several years, while soft contact lenses come in a wider variety of replacement schedules: daily disposable-1 day, disposable (extended wear)-1 week to 1 month, disposable (daily wear)-2 weeks, frequent replacement (also called "planned replacement"), 1 month to several months, conventional 1-year, depending on brand. Generally, hard contact lenses are available for different wear schedules, such as daily wear, and extended wear or overnight wear. Also, with planned-replacement lenses, an eye care practitioner works out a replacement schedule tailored to each user's needs. For example, for users who produce a higher level of protein in their eyes or do not take as good care of their lenses, it might be healthier to replace the lenses more frequently. Therefore, the onus to keep track of the wearable life of the lenses falls on the user. As such, if a user does not record the date of first use, or subsequent usage, as time passes it can become difficult to recall how long a particular pair of contact lenses has been worn.

Despite recommendations by eye care practitioners to replace lenses as specified in the prescriptions, most users continue to use these lens well past the expiration date or replacement date, whether unwittingly or otherwise. Such practices present a serious safety concern with contact lenses. Extended wear of contact lenses, rigid or soft, beyond the replacement schedule or wear schedule, increases the risk of corneal ulcers, infection-caused eruptions on the cornea that can lead to blindness. Symptoms include vision changes, eye redness, eye discomfort or pain, and excessive tearing. Another sight-threatening concern is the infection Acanthamoeba keratitis, caused by improper lens care. This difficult-to-treat parasitic infection's symptoms are similar to those of corneal ulcers. Several solutions for tracking the wearable life of a contact lens have been presented in the prior art, however these solutions place the onus of tracking the day-to-day wear of the lenses on the user, and are prone to error.

It is thus one of the objects of this invention to mitigate or obviate at least one of the aforementioned disadvantages.

SUMMARY OF THE INVENTION

In one of its aspects the present invention provides a manufacturing method for an optical device, comprising a step of providing the optical device with data carrier means for carrying data related to the optical device, the data carrier having data carrier means operable in at least one of an electrical mode and a magnetic mode; the data carrier means being deposited on, attached to, at least one of a posterior surface, a anterior surface, or combined with the optical device material, wherein data carrier means emits a data signal periodically or in response to a external signal from an external means; the data signal bearing the data related to the optical device, the data including, but not limited to, a SKU, unique ID, manufacturer, logo, material of manufacture, composition, lot no., batch no., warehouse related data; promotional material (rebate for next pair purchase or free trials), lens features and benefits data, health warnings, data on potential risk or complications, insurance coverage data, regulatory data, authenticity data, fitting details, orientation of the lens (inside-out/right side-out or back surface/front surface), lens type data, lens care or handling information, recommended usage information such as wear schedule, filling pharmacy, health professional information, time, an optical lens user's personal details, prescription information, right eye/left eye identification data, expiration data, a URI, spectral passing band (nm), UV cut-off, optical refractive index, Abbe value, transmittance % or haze (%) for a particular thickness.

In another of its aspects the present invention provides an optical device with data carrier means for carrying data related to the optical device, the data carrier means being operable in at least one of an electrical mode and a magnetic mode; the data carrier means being associated with an optical device by at least at least one of the group of depositing on, printing on, combining, inserting, implanting, glueing, laminating, hot pressing, rolling into, molding, stamping, retrofitting, embossing, emulsifying, suspending, floating or mixing in liquids, electrostatic bonding, embedding by polymer polymerization, wherein the data carrier means emits a data signal periodically or in response to a external signal from an external means; the data signal bearing the data related to the optical device, the data including any of a SKU, unique ID, manufacturer, logo, material of manufacture, composition, lot no., batch no., warehouse related data; promotional material (rebate for next pair purchase or free trials), optical device features and benefits data, health warnings, data on potential risk or complications, insurance coverage data, regulatory data, authenticity data, fitting details, orientation of optical device (inside-out/right side-out or posterior surface/the anterior surface), optical device type data, optical device care or handling information, indications, recommended usage information such as wear schedule, filling pharmacy, health professional information, time, an optical device user's personal details, prescription information, right eye/left eye identification data, expiration data, URI., spectral passing band (nm), UV cut-off, optical refractive index, Abbe value, transmittance % or haze (%) for a particular thickness.

The optical device includes, but is not limited to, a contact lens, intra-ocular lens, lens for eyeglasses, or an optical lens, a monocular lens, a trial lens, a test lens, a fitting lens, binoculars lens, a telescope lens, a spotting scope lens, a telescopic gun sight lens, a theodolite lens, a microscope lens, a camera lens, an imaging lens, a CCD/CMOS lens, a custom lens, a medical device lens, a lens for automotive applications, an optical filter, a cut-off filter, an optical low-pass filter, a window, an optical window, a diffuser, a plate, a prism, a prism mirror, a mirror, optical glass, strip form, blanks or fine gobs, a glass substrate, a glass-ceramic substrates, a TS-10 glass-ceramic substrate, a LCOS prism or lens, a beam splitter, an astronomical optical component, an optical component for illumination systems, an optical component educational optics, a magnifier lens, an optical component for spectroscopic applications, and an optical component for a medical apparatus or medical system.

In another of its aspects the present invention provides a method and system for tracking the life or age of an optical device, the method comprising the steps of: providing the optical device with data carrier means for carrying data related to the optical device, the data carrier having data carrier means operable in at least one of an electrical mode and a magnetic mode; providing an activation signal from an external means; activating the data carrier means with the activation signal to cause the data carrier means to emit the data in response to the activating signal; recording the time the data carrier means is interrogated; and processing the received data to determine the age or wearable life, or useful life, of the optical device based on the time of the activation signal and a predetermined time as a reference or milestone.

In another of its aspects the present invention provides a method and system for determining the orientation of an optical device. The optical device comprises an anterior surface and a posterior surface, the method having the steps of providing the optical device with uniquely identifiable data carrier means for carrying data related to the optical device, the data carrier having data carrier means operable in at least one of an electrical mode and a magnetic mode; the data carrier means being deposited on at least one of a posterior surface, an anterior surface, and an edge surface; providing an activation signal from an external means; activating the data carrier means with the activation signal to cause the data carrier means to emit a data signal in response to the activating signal; processing the emitted data signal to determine the characteristics the emitted data signal; whereby the data signal emitted by the data carrier means on any of the lens surfaces is distinguishable from one another. Thus, the anterior surface or the posterior surface or the edge surface can be determined based on the emitted data signal characteristics of the uniquely identifiable data carrier means to the external means, to permit a user to readily position the optical device appropriately. For, example, a user can readily determine the eye contacting surface of a contact lens prior to insertion.

In another of its aspects the present invention provides a method for determining the orientation of an optical device in order to place the device in a preferential orientation, the method including the steps of: having data carrier means associated with the optical device, the at least one data carrier having a unique identifier; transmitting a signal from a reader to the data carrier means; comparing signals from the data carrier arriving at least two identical receivers of a data carrier reader with closely spaced antennae; determining the identity of the data carrier, an angle of arrival of the signals from the data carrier means and hence the direction of that data carrier means from the data carrier reader; issuing at least one advisory signal indicative of the orientation of the device with respect to the desired application site, or a preferred orientation, whereby the at least one advisory signal is an aid to correct the rotation or orientation of the device for placement in the preferential orientation of the lens.

In another of its aspects the present invention provides a method of determining a toric contact lens angle of lens rotation on the cornea of a person's eye so that a suitable contact lens can be prescribed. Alternatively, this method may be applied to other optical device that includes an optical power which varies radially and circumferentially about the optic axis of the device.

In another of its aspects the present invention provides a method and system, and a method of manufacturing thereof, for a contact lens having an optical power which varies radially and circumferentially about the optic axis of the lens comprising data carrier means associated with the lens, the data carrier being disposed in the peripheral portion of the lens adjacent the periphery and along at least one axis of the lens, or the data carrier being disposed in a predetermined position as a marker, to cause the lens to maintain a predetermined orientation upon the eye of a wearer and consistently maintain a preferential orientation upon the eye of a wearer based on the location of the data carrier means marker on the lens.

Advantageously, by having the correct orientation of lens, problems such as distortion of the optical properties of the lens, and discomfort to the eye, and eye damage, are significantly diminished. Tracking the life of a lens would be beneficial to the user as this helps to ensure that the prescription remains current and that the lens is replaced as prescribed. Additionally, this helps to prevent potential eye infections resulting from bacteria build up on a lens surface due to prolonged wear, as well as degradation of a wearer's eyesight due to lens deterioration. Another advantage is that this prevents unnecessary early disposal of the lens. In addition, as the determination of the optical device is made readily without visual inspection, this obviates the need for time-consuming measurement procedures using expensive equipment.

BRIEF DESCRIPTION OF THE DRAWINGS

These and other features of the exemplary embodiments of the present invention will become more apparent in the following detailed description in which reference is made to the appended drawings wherein.

DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
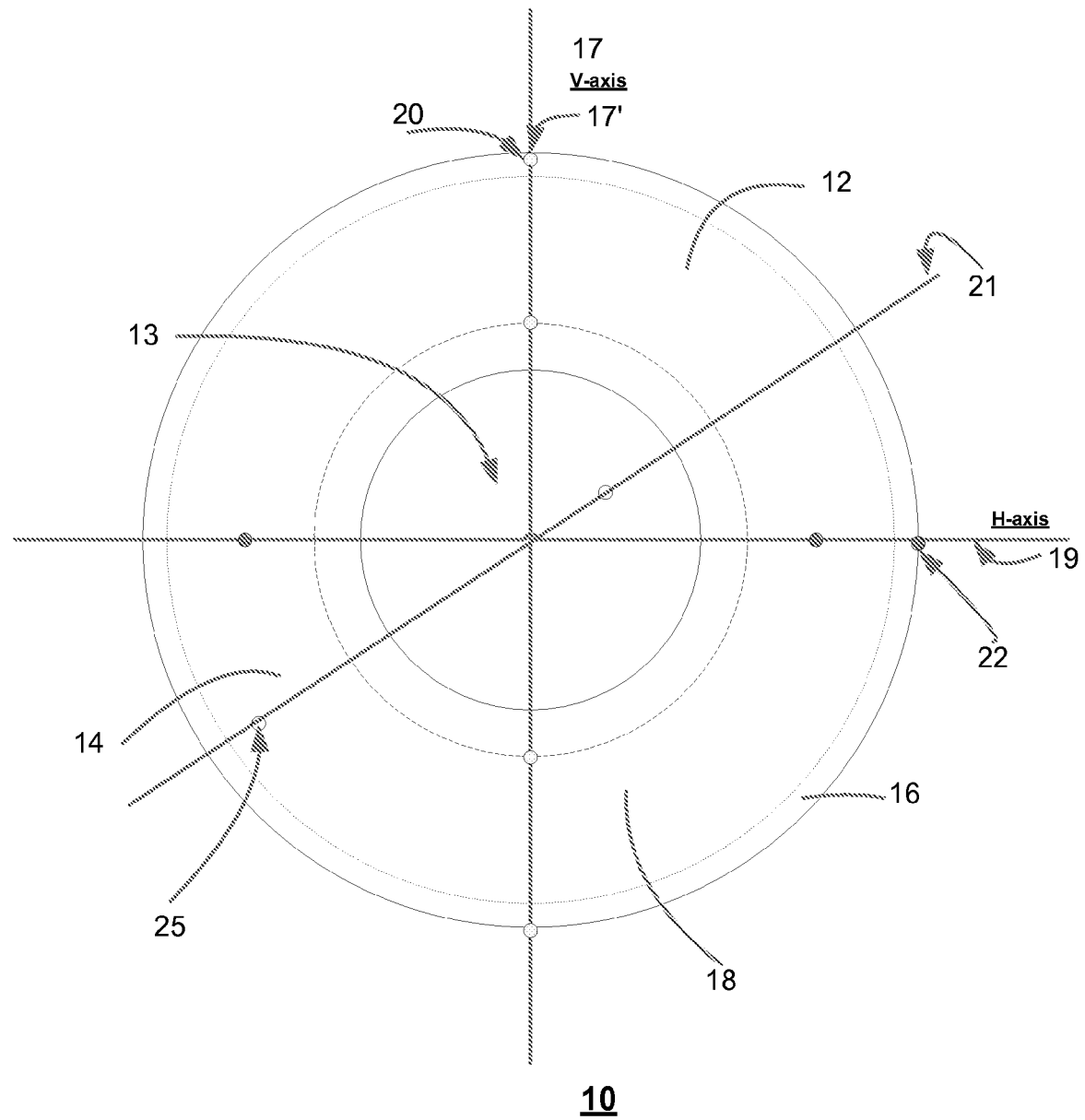
FIG. 1 is a plan view of an optical lens, in an exemplary embodiment of the present invention.

Referring to FIG. 1, there is shown an optical device 10 having features for characterization thereof, such as an ophthalmic device, in an exemplary embodiment of the present invention. The ophthalmic device 10, as disclosed in the exemplary embodiments, includes, but is not limited to, ophthalmic lenses, soft contact lenses, hard contact lenses, bifocal contact lenses, multi-focal contact lenses, colored contact lenses, disposable contact lenses, extended wear contact lenses, gas permeable (GP) contact lenses, rigid gas permeable (RGP) contact lenses, monovision lenses, orthokeratology lenses, prosthetic contact lenses, silicone hydrogel contact lenses, special-effect contact lenses, specialty lenses, toric contact lenses, bi-toric contact lenses, aspherics, lenticulars, spheres, intraocular lenses or implantable collamer lenses (ICL), overlay lenses and onlay lenses.

An exemplary lens 10 includes an anterior surface 12, an opposing posterior surface 14 surrounded by a peripheral edge 16, an edge surface (not shown), such as a spherical lens edge formed from surfaces 12, 14 which have a spherical curvature. The contact lens 10 also includes an optical zone 13 surrounded by a peripheral zone 18. The contact lens 10 can comprise any known material useful for making contact lenses, which may include, but is not limited to, HEMA, POLYMACON, METAPHILCON A, HEMA 38 (TEFILCON), POLYHEMA, CROFILCON A, HEMFILCON A, HEMA 38 (TEFILCON) PHEMFILCON A, TETRAFILCON A, 41% OMAFILCON A, HEMA-GMMA, MODIFIED HEMA, PMMA, BENZ x-3, BENZ METAPHILCON, HEFILCON B, CROFILCON A, TEFILCON, SYNERGICON A, HEMA-VINYL METHACRYL, HEMA-VP, XYLOFILCON A, DL 77, HIOXIFILCON A, BOSTON ES, BOSTON XO, BOSTON ES, SILPERM 50, FSA, PARAGON DK 60, FLUOROSILICONE ACRYLATE, SILOXANE-FLUOROCARBON ACRYLATE, HILAFILCON B, BALAFILCON A, ALPHAFILCON A, METHAFILCON A, NELFICON A, VIFILCON A, VASURFILCON A, OCUFILCON B, ETAFILCON A, GALYFILCON, and SENOFILCON A.

The lens 10 includes at least one data carrier 20 or 22 on any surface of the lens 10, such as the anterior surface 12, the posterior surface 14, or the edge surface (not shown) extending between the anterior surface 12 and the posterior surface 14. The data carrier 20 or 22 may be any suitable means for retaining data operable in an electrical and/or magnetic mode, such as a radio identification device or RFID tag, as implemented in an exemplary embodiment of the present invention. For example, each of the tags 20 can be implemented as a passive tag, an active tag, or a semi-passive tag. Those skilled in the art will recognize that active, semi-passive tags, or passive tags share many features and that can be used with this invention. In the past an RFID device that did not actively transmit to a reader was known as a 'tag,' while an RFID device that actively transmitted to a reader was known as a transponder (TRANSmitter+resPONDER). It has become common in the industry, however, to interchange terminology and refer to these devices as either tags or transponders more or less interchangeably. In this specification, for clarity of usage, the term 'tag' is used to refer generally to all RFID devices.

Generally, RFID systems use a variety of techniques to transmit data to and from the tag. For transmission to the tag, the data can be transmitted using any of a variety of modulation techniques including, but not limited to, amplitude modulation (AM), phase modulation (PM), and frequency modulation (FM). Furthermore, the data transmitted to the tag can be encoded using any of a variety of techniques, including frequency shift keying (FSK), pulse position modulation (PPM), pulse duration modulation (PDM) and amplitude shift keying (ASK). In general, passive tags have no battery or internal power source, and operate by back-scattering or load modulation of an incident RF signal, which may be transmitted by one of the Although some types of passive tags can store energy for a period of time, passive tags typically require continuous input power as an energy source. Active tags generally include an internal power source such as a battery, photovoltaics, or any other suitable type of power source. Further, active tags can transmit RF signals in response to a request or command provided by a reader, on a predetermined schedule (e.g., every 10 seconds or every 300 seconds), or upon detection of a threshold event. This energy source permits active tag to create and transmit strong response signals even in regions where the interrogating radio frequency field is weak, and thus an active tag can be detected at greater range. Semi-passive tags are hybrids of passive and active tags, and are generally configured to provide improved read-range, data storage, sensor sophistication, level of security, etc., in comparison with purely passive tags.

As discussed above, passive and semi-passive tags transmit by selectively reflecting and absorbing energy from the reader, in a process generally referred to as backscatter modulation. Again, in backscatter modulation, the data can be encoded using a variety of techniques. For example, the data can be encoded using FSK, where the tag absorb-reflects at one rate to represent a first state (e.g., "one") and at another rate to represent a second state (e.g., "zero"). As another example, the data can be encoded using ASK, where the tag absorb-reflects at one rate for some duration to represent a first state (e.g., "one") and ceases back scatter modulation for another duration to represent a second state (e.g., "zero"). RFID systems also typically use a variety of different frequency ranges, such as, 30 KHz-500 KHz, 850 MHz-950 MHz and 2.4 GHz-2.5 GHz, depending on the regulatory spectrum allocations and performance requirements matched to various application requirements.

As an example, the tag 20 may include the contactless IC chip, which is manufactured by Hitachi, Japan, measuring 0.15×0.15 millimeter (mm), 7.5 micrometer (μm) thick or the μ-chip™ which features an internal antenna. These chips can thus operate entirely on their own, making it possible to use μ-Chip as RFID IC tags without the need to attach external devices, such as antennae, making these tags, or similar tags, ideal for application in the present invention. Similar to the 0.15 mm square chip, the μ-chip is manufactured by Hitachi, Japan, using silicon-on-insulator (SOI) fabrication process technology. The μ-chip operates at a frequency of 2.45 GHz, and includes a 128-bit ROM for storing a unique ID and may include a non-volatile memory. Typically, this type of tag 20, or similar, is dimensioned to be attached to, imprinted on, or embedded in a contact lens 10 or 11 without detriment to the user's vision or comfort. Other suitable next-generation multi-band UHF-RFID tags with built-in antenna, such as UHF-RFID chips in 800 MHz-2.45 GHz frequency-range may be used, or any tags based on the EPCglobal standard, such as the EPCglobal UHF Generation 2 standard. Another suitable tags include an 'internal' coil antenna is formed directly on the surface of the chip, such as Coil-On-Chip™ technology from Maxell, Japan.

Preferably, the tag 20 or 22 is located on the lens 10 in a predetermined location, such as, along at least one axis 17, 19 or 21 of the contact lens 10. Preferably, the tag 20 is dimensioned so that it does not interfere substantially with the lens 10 configuration, alter the prescription, or cause the lens 10 to deteriorate, or does not irritate the eye of the lens wearer or give any discomfort to the lens wearer.

Figure 2:
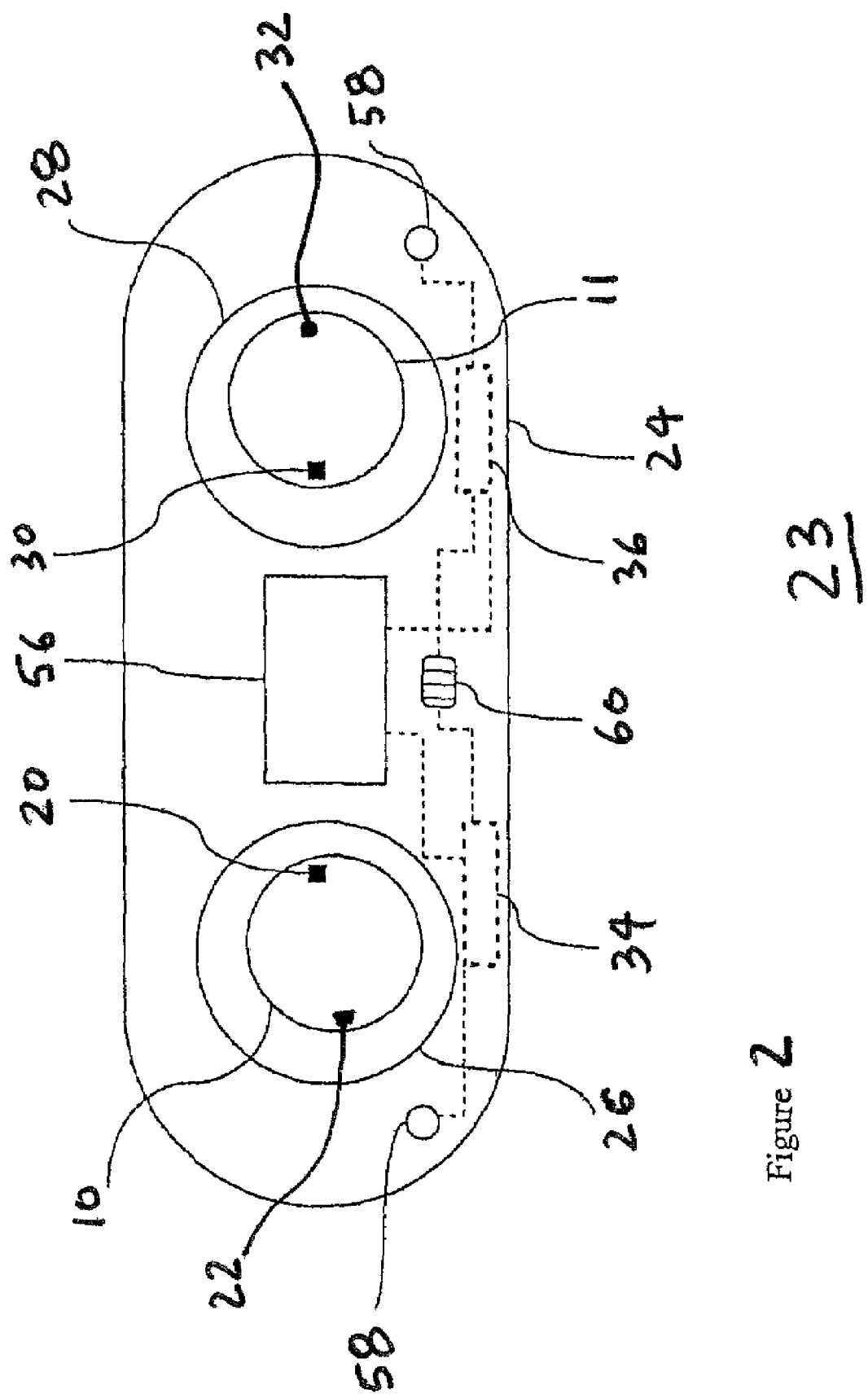
FIG. 2 is a schematic of a system for determining the characteristics of the optical lens.

FIG. 2 shows a system 23 for determining the characteristics of optical lenses 10, 11. The system 23 comprises a container 24 for storing the pair of lenses 10 and 11, in an exemplary embodiment of the present invention. Disposed within a receptacle 26 of the container 24 is the contact lens 10, while the contact lens 11 is disposed within a receptacle 28, in a conventional manner. The container 24 has a substantially planar top surface and the receptacles 26, 28 are generally concave when viewed from the side of the container 24. The receptacles 26, 28 include a liquid medium, such as saline solution or any other suitable contact lens storing liquid. The lens 10 is prescribed for the user's left eye, hereinafter the left lens 10, includes at least one data carrier 20 or 22, and the lens 11 is prescribed for the user's right eye, hereinafter the right lens 11, with at least one data carrier 30 or 32 The system 23 also includes at least one interrogation unit, such as, data carrier readers 34 and 36, which have the capability of reading data associated with the data carrier 20, 22, 24, or 26 or writing data to the data carrier 20, 22, 24, or 26. For convenience, only the reader 34 will be discussed in operation with the tag 20, since this operation is similar to the interaction between the reader 34 and tag 22; and similar to the interaction between the reader 36 and tag 30, 32; and the readers 34 and 36 possess like elements, while tags 20, 22 and 30, 32 also possess like elements.

Figure 3:
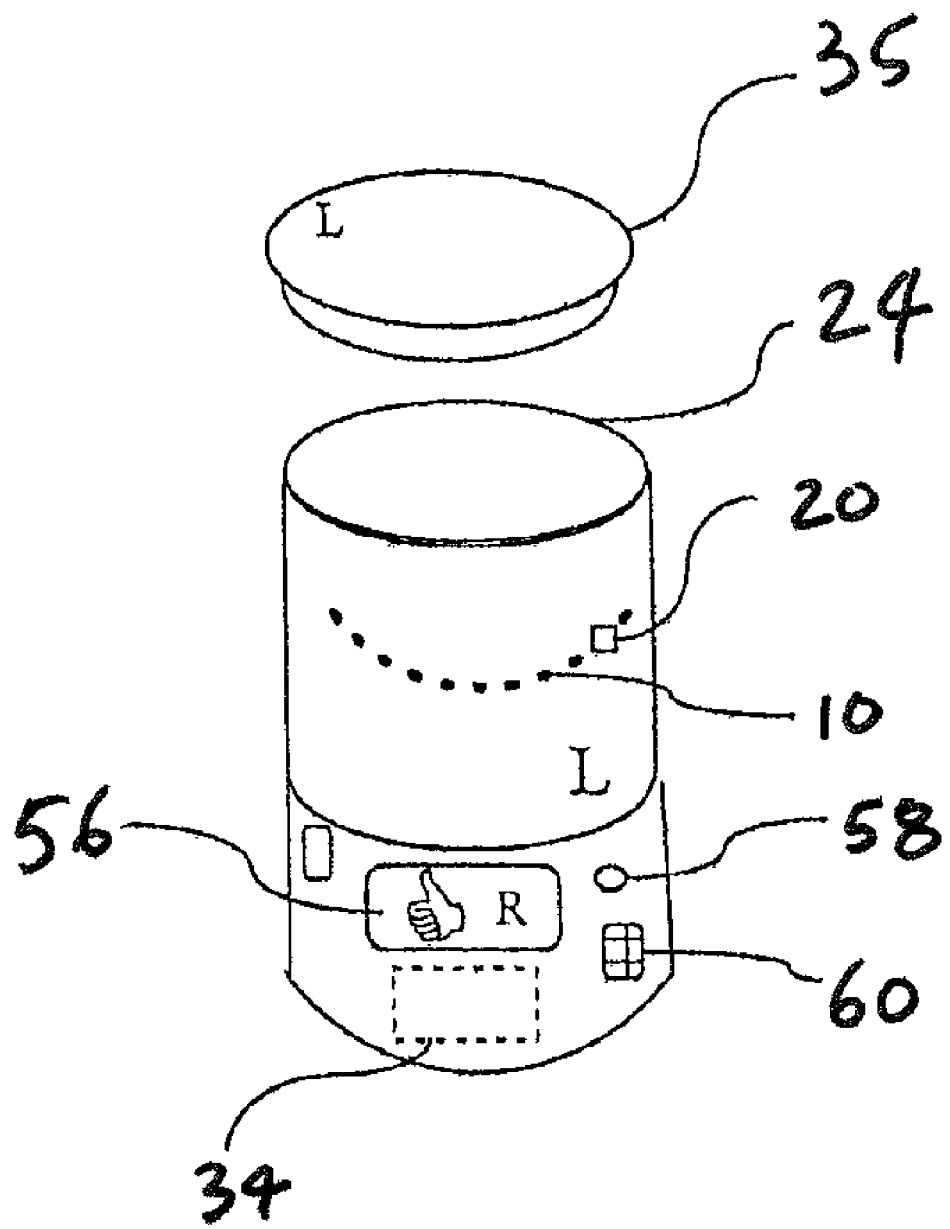
FIG. 3 is a perspective view of an exemplary type of container for use with the system of FIG. 2.

In another embodiment, as shown in FIG. 3, the container 24 has a left-reader 34 for storing the left lens 10 with the tags 20, 22 associated therewith. Another container 24 includes a right-reader 36 (not shown) for storing the right lens 11 with the tags 30, 32 associated therewith. The container 24 includes a cover 35.

Figure 4:
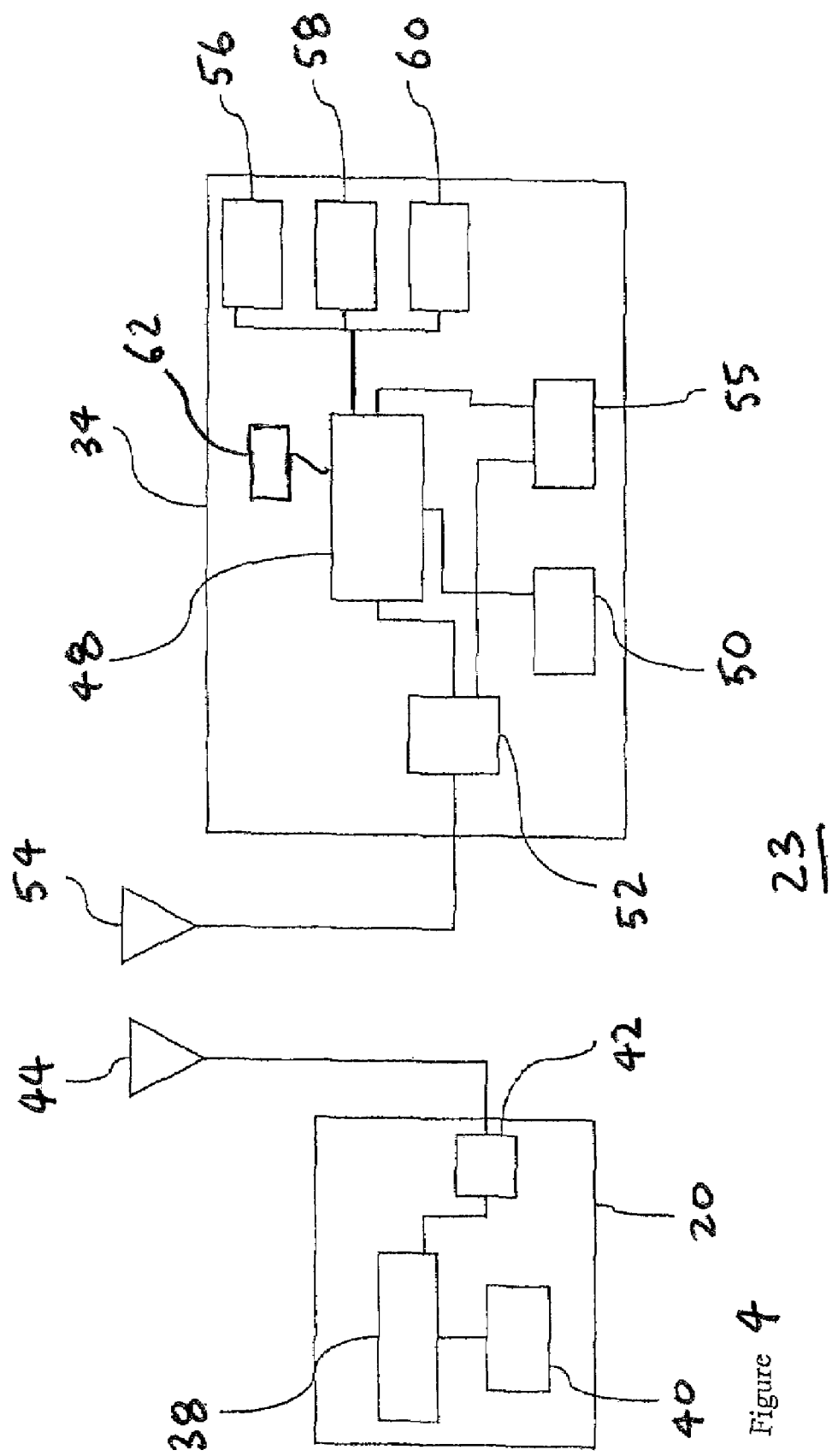
FIG. 4 is a schematic block diagram of the system of FIG. 2.

FIG. 4 shows the passive tag 20 in a block diagram form, and includes a processor module 38, a computer readable medium 40 or memory module, a transmitter/receiver module 42, and an antenna module 44. The transmitter/receiver module 42 controls the communication of data to and from the external reader 34 via the antenna module 44. The computer readable medium 40 serves many functions including accommodating security data and operating system instructions for the tag 20 which, in conjunction with the processor 38 or processing logic, performs the internal "house-keeping" functions such as response delay timing, data flow control and power supply switching. The computer readable medium 40 may include non-volatile programmable memory and/or volatile memory for data storage. The computer readable medium 40 also facilitates temporary data storage during tag 20 interrogations and response, and store the tag 20 data and retains data when the tag 20 is in a quiescent or power-saving "sleep" state. The computer readable medium 40 may further include data buffers to temporarily hold incoming data following demodulation, and outgoing data for modulation.

The tag 20 may include data may include, and is not limited to, an identification number or a unique ID used to identify the tag 20 associated with a particular contact lens, SKU, manufacturer, logo, material of manufacture, composition, date of manufacture, lot. no., batch no., warehouse related data; promotional material (rebate for next pair purchase or free trials), lens features and description, lens benefits data, health warnings, data on potential risk or complications, insurance coverage data, regulatory data, authenticity data, encryption data, fitting details, lens type data, lens care or handling information, recommended usage information such as wear schedule, expiration data, URI., lot number, storing liquid medium, UV cut-off, optical refractive index, Abbe value, transmittance % or haze (%) for a particular thickness, and so forth.

As shown in FIG. 4, the reader 34 includes a processor module 48, a computer readable medium 50, a transmitter/receiver module 52, an antenna module 54 and a power supply unit 55. The antenna module 54, which may include an antenna array, is coupled to the transmitter/receiver module 52, which includes a transmitter or multiple transmitters to emit electromagnetic waves that are used to provide an interrogating field to the tag 20, and receive response signals from the tag 20 via a receiver or multiple receivers. The reader 34 also includes an actuation means for powering on same, the actuation means may be require user intervention, or may be automatic. As such, the actuation means may include any of the following: switch, sensor, proximity switch means (AC or DC inductive and capacitive), or reads triggered by a schedule, an external event or command. The memory capacity on the computer readable medium 50 of the reader 34 can be unlimited, and can be coupled to other memory modules on the devices such as volatile and non-volatile memory, including, but not limited to, flash memory, hard disk drive, Floppy, optical disks (DVDs, CDs etc. The reader 34 may include a database with a computer readable medium which stores records of any of the above-noted data relating to the contact lens 10. The tag 20 may further include interface circuitry to direct and accommodate the interrogation field energy for powering purposes and triggering of the tag 20 responses. For example, the reader 34 may transmit activating signals or interrogation signals to the tag 20 automatically on a periodic basis. The reader 34 may also employ sleep modes to conserve power.

The reader 34 includes input/output means for interacting with the system 23 or for outputting advisory signals or warnings. The input/output means may include, but are not limited to, a graphical user interface, a touch screen display, display means 56, a microphone, stylus, keypad, keyboard, buttons, and LED(s) 58, a speaker 60. In another embodiment, as shown in FIG. 3, the container 24 has a left-reader 34 for storing the left lens 10 with the tags 20, 22 associated therewith. The container 24 also includes a reader 34, a display 56, an LED 58 and a speaker 60. The reader 34 can thus interrogate the tag 20, even when the lens 10 is in contact with liquid storage medium. Thus, the user can verify the identity or characteristics of the lens 10 by referring to the output signal. For example, the reader 34 is enabled by the user manually to display the characteristics of lens 10, or automatically upon sensing the user's proximity to the container 24 through contactless proximity sensor means, and so forth. Alternatively, only one container 24 includes the reader 34 for identification of either lens 10 or 11.

In another exemplary embodiment of the present invention, the receptacle 26 is assigned to hold the left lens 10, while the receptacle 28 is assigned to hold the right lens 11. As such, due to these predetermined assignments, it is expected that the left lens 10 and the right lens 11 be stored in their respective receptacles 26 or 28, as shown in FIG. 2 or FIG. 3. Therefore, the left reader 34 issues interrogation signals to the left receptacle 26, and processes the received tag data to determine the identity of the lens 10 or 11. If the lens is indeed the left lens 10, then the left reader 34 outputs a signal indicative of a match to the user, otherwise the left reader 34 outputs a signal indicative of a no-match, or that the lens does not belong in that particular receptacle 16. The output signal may be in any form that provides a stimulus to a human body, such as visually, auditorily. For example, the visual output signal for a match or no match may include any number of messages with at least one alphanumeric character or at least one symbol or combination of characters and/or symbols or figures. Thus the messages can include any language or any widely accepted or predetermined symbols indicative of a positive state or a negative state. The right reader 36 also works in a similar fashion to determine the identity of a lens 10 or 11. For example, the following messages may be used to indicate a match:

"MATCH", "Lens OK", "OK", "Yes", "1", "OUI", "EHE", "YEBO", "YE", "Ano", "Ja", "Ken", "Si", "Tak", 开恩, ♪, ☺, ✔ yes, ✤.

As an example, the following messages may be used to indicate a non-match: "NO MATCH", "No", "0", "Ne", "Nyet", "Nee", "Nie", "Lo", "AIWA", "KWETE", 开恩, .১.×.×No, ⊙.⊖.৭.

The output signals may be in the form of visible signals such as light from an LED 58. The LED 58 may output a particular visible signal depending on the outcome of the match/non-match determination, or may emit a visible signal with a particular duty cycle, such as 30 percent for a match and 90 percent for a non-match. For example, a match can be indicated by an LED 58 that is lit permanently for a predetermined time, while or a non-match can be a flashing LED 58, such that the two states are clearly distinguishable. The LED 58 may be blinked on and off in a binary code pattern or Gray code pattern. By using the Gray code pattern each LED 58 is turned on and off in turn for only one cycle of a predetermined repeated pattern. Alternatively, the system 23 may include different colored LEDs 58 to indicate a particular outcome.

In the instance of output signals being in the form of audible signals, a speaker 60 outputs a particular audible signal depending on the outcome of the match/non-match determination. For example, the audible signal may a message or phrase in any language indicative of a positive state or a negative state, such as "MATCH", "Lens OK", "OK", "Yes", "OUI", "EHE", "YE", "EHE", "YEB0", "YE", Ano", "Ja" "Ken", "Si", "Tak" for a match; or "NO MATCH", "No", "Ne", "Nyet", "Nee", "Nie", "Lo" "AIWA", "KWETE", for a non-match. Also, the speaker 60 may emit an audible signal with a particular duty cycle of indicative of a positive state or a negative state, such as a fast beeping sound for a non-match and a slow beeping sound for a match. However, these messages may include both visual signals and audible signals. Advantageously, audible signals are beneficial where ambient light conditions are poor or when vision is impaired temporarily, or when a visual aid is required to decipher the information presented via the output means 56. Alternatively, the system 23 may include only one reader 34 or 36 to determine the identity of the lenses 10, 11, such that a user can determine the identity of the lens 10 or 11 before storage to place the lens 10 or 11 in the correct receptacle 26 or 28, or before insertion of the lens 10 or 11 into the eye.

Figure 5:
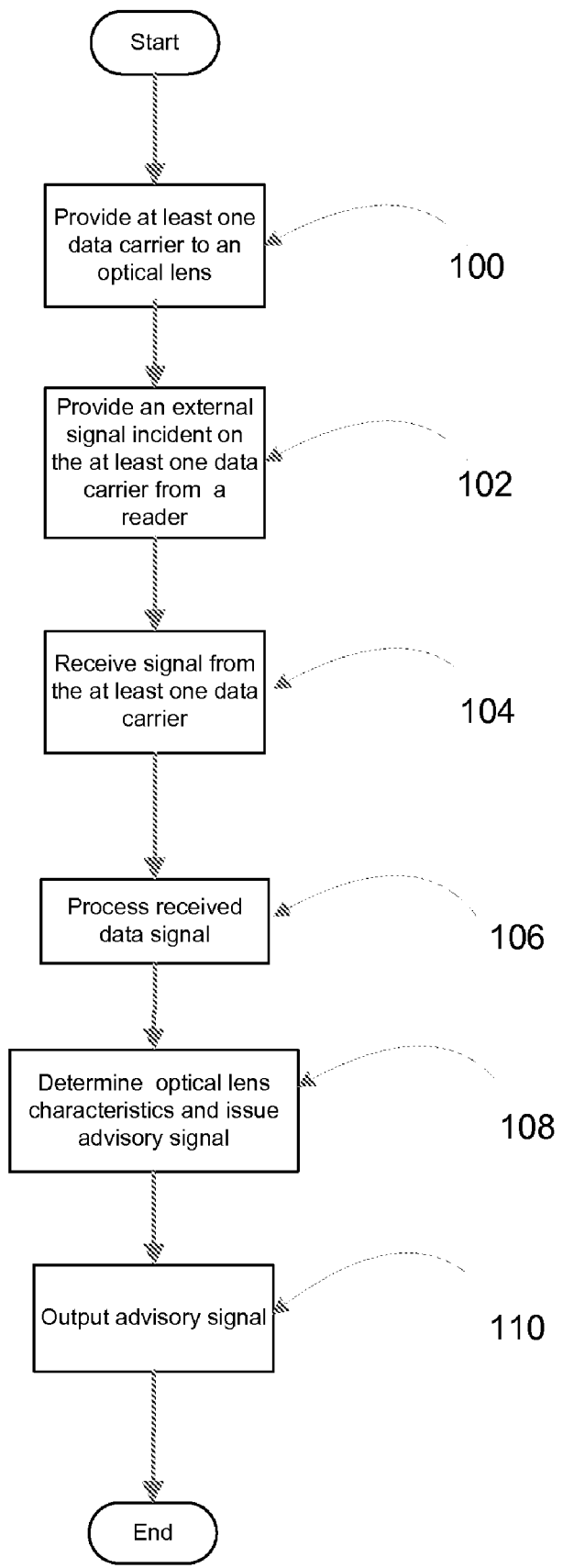
FIG. 5 is a flowchart outlining the steps for determining the characteristics of the optical lens.

In another embodiment, the system 23 or reader 34 tracks the age or the time the optical device 10 has been in use, or the wearable life or useful life of an optical device 10. For example, for a contact lens 10 the system 23 or reader 34 may determine the impending expiry of the lens 10, and notify the user accordingly. As stated above, non-adherence to the recommended wear or replacement schedule, or prolonged use of the expired lenses 10, 11 may cause discomfort, inflammation, swelling, abrasion, or another problem that could result in permanent eye tissue damage. Additionally, for toric lenses, which unlike sphericals do not rotate in the eye, certain areas of the lens build up deposits more quickly than others. An uneven build up of deposits may impact on the rotational stability of the lens. The method for determining the tracks the age, wearable life or useful life of an optical device 10, such as a contact lens 10, will now be described, with reference to the flowchart of FIG. 5. The method includes the step of providing an identifying means comprising a data carrier with the contact lens 10, in step 100. The data carrier includes a device 20 operable in at least one of an electrical mode and a magnetic mode, such as a tag 20, as described above. The contact lens 10 is included with a tag 20 at manufacture, or included with the lens 10 post manufacture by any suitable means, and data, such as: expiration data, SKU, manufacturer, authentication data, date of manufacture, is written onto the memory 40 of the tag 20, in step 102.

For example, the following data relating to a typical contact lens prescription, may be included at manufacture:

OS—
Brand name: Riffed Lens
BC: 8.2
BC: 8.2
POWER: −3.50

OD—
Brand Name: Riffed Lens
BC: 8.2,
DIA: 14.2
POWER: −2.00
CYL & AXIS: −1.75 X 90°

The BC or base curve—measure of curvature with regard to the contact lens and in most cases this decimal figure is the same for both the left and the right eyes.

DIA or DIAM.—decimal figure for a measure of the diameter of the contact lens

POWER—the lenses' power (sometimes also called the sphere or Rx number) is either written in a "positive" (+) or "negative " −"format and can range from between −20.00 to +20.00.

CYL refers to the strength of the patients astigmatism and is represented by a + or −number. The AXIS provides information on the "orientation" of the astigmatism and can anything between 0 and 180 degrees.

Also, additional data may be included with the tag 20 post-manufacture of the lens 10. Data may be written at the dispensing point or point-of-sale (POS) by an eyecare practitioner, such as, optometrists, ophthalmologists and opticians, or at the operating point by the user. The post-manufacture data in addition to contact lens manufacture data, as stated above, may include prescribing eyecare practitioner, filling pharmacy, health professional information, date & time the prescription was filled, lens user's personal details, prescription information, right eye/left eye identification data, fitting details, and so forth.

As stated above, the contact lens 10 may be associated with an tag 20 post-manufacture of the lens 10, such as, at the dispensing point or point-of-sale (POS) by an eyecare practitioner, such as, optometrists, ophthalmologists and opticians, or at the operating point by the user. Therefore, the eyecare practitioner can write data onto the tag 20, as stated above.

Next, an activation signal is provided from an external means, such as a reader 34, in step 104. The tag 20 is thus energized by the activation signal to cause the tag 20 to emit data in response to the activating signal. The time when the contact lens 10 is first interrogated by the reader 34 is recorded, this time may correspond to the time the contact lens 10 is first introduced into the container 24. The transceiver 52 receives the data and the processor module 48 processes the received data, in step 106.

A counter 62 coupled to the processor 48 is provided with the system 23, and counts the elapsed time from, or to, a time reference, such as the first instance of interrogation of the lens 10 by the reader 34 marking first time use, and notifies the logic means 48 when a particular time threshold has been reached, close to be reached or surpassed. The time reference or time threshold may be user defined, or third-party defined, or the date of manufacture, or the expiration date. The counter 62 may be a real time clock. For example, the recommended period of wear may be expressed in hours or days. The counter 62 may count up or count down from one particular time reference to another particular time reference, and these particular time references may be associated with a request for action from the user, or may be an advisory signal. For example, the counter 62 may count up from the date of manufacture to the expiration date, and outputs the wearable time remaining. The processor module 48 the issues an advisory signal associated with the contact lens 10, in step 108. The user can be notified of impending expiry, and actual expiry, of the lens 10 via an advisory signal means, either visually or auditorily or some other a stimulus to a human body, step 110.

At this time, the user may be prompted to seek a new prescription or obtain a new lens 10 or 11 or a lens pair 10, 11. The system 23 may also inform the user the minimum period the contact lens 10 or 11 should be left out of the eye before re-insertion, or the recommended number of times, if any, that the contact lens 10 or 11 should be cleaned. Should the right lens 10 and the left lens 11 have different expiration dates, as in the case when one lens 10 or 11 is damaged or lost and has to be replaced singly, then each lens 10, 11 may have its own counter 62.

The counter 62 may be a real time clock, and may determine the age or wearable life of the lens 10 or 11 by comparing the expiration date or the manufacturing date to contemporaneous time data related to the interrogation by the reader 34. The system 23 may issue advisory signals visually, such as "Lens Expired", "Change Lens", "Remove Lens Daily", Store Lens for 5 hrs each day", "Clean Lens", "45 Days left", "New Rx required" messages or a plethora of symbolic messages. The advisory signal may also be audible. The system 23 can output the advisory signals automatically or the user can query the system 23, using an interactive display or keypad or buttons coupled to the reader 34. The system 23 may also analyze the received data and track the amount of time the lenses 10, 11 are actually worn by the user, and compile reports relating the user data. Therefore, the system 23 may thus determine whether the prescription is being followed, for example if dailies are worn for more than 24 hrs, or whether overnights are being worn beyond the prescribed maximum time period, such as 30 days. Using the historical data, the system 23 may recommend a wearing time dependant on the user's individual needs, or recommend another prescription with a different wearing schedule. The reports may also be issued to other interested parties, such as, eye practitioners and insurance companies.

Figure 6:
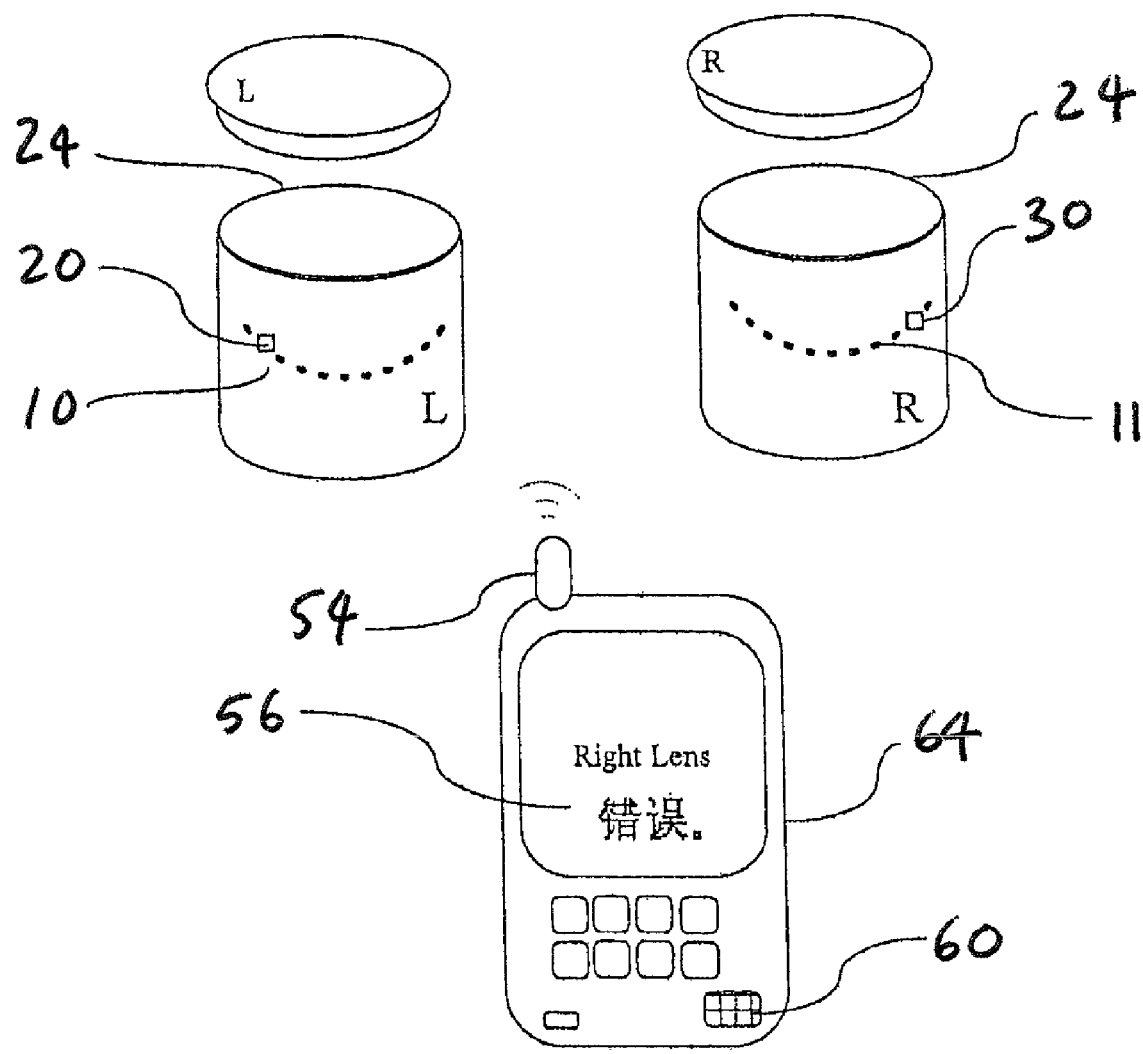
FIG. 6 is a perspective view of another exemplary system for determining the characteristics of the optical lens, in another embodiment.

In another embodiment, as shown in FIG. 6, the reader 34 is integrated in a digital data processing device 64, which can include a personal computer (PC), a computer workstation, a laptop computer, a server computer, a mainframe computer, a wearable computing device, a handheld device (e.g., a personal digital assistant (PDA), a Pocket PC™, a cellular telephone, an e-mail device, a smart phone, a wrist watch, an information appliance, and/or another type of generic or special-purpose, processor-controlled device capable of receiving, processing, and/or transmitting digital data. Typically, a digital data processing device 64 includes a processor, a computer readable medium and input/output means. Processor refers to the logic circuitry that responds to and processes instructions that drive digital data processing devices such as, without limitation, a central processing unit, an arithmetic logic unit, an application specific integrated circuit, a task engine, and/or combinations, arrangements, or multiples thereof. Instructions for programs or other executables can be pre-loaded into a programmable memory that is accessible to the processor and/or can be dynamically loaded into/from one or more volatile (e.g., RAM, cache, etc.) and/or non-volatile (e.g., a hard drive, optical disk, compact disk (CD), digital video disk (DVD), magnetic disk, magnetic tape, internal hard drive, external hard drive, random access memory (RAM), redundant array of independent disks (RAID), IC memory card, flash memory, or removable memory device) memory elements communicatively coupled to the processor. The instructions can, for example, correspond to the initialization of hardware within the digital data processing devices, an operating system that enables the hardware elements to communicate under software control and enables other computer programs to communicate, and/or software application programs that are designed to perform operations for other computer programs. Thus, a set of instructions is included in the computer-readable medium is for performing operations or functions related to the system 23 or the operation of the digital data processing device 64. For example, the system 23 may provides a computer program product encoded in a computer-readable medium including a plurality of computer executable steps for a digital data processing device 64 to determine the identity of a lens 10 or 11. A user can interact with the system 23, for example, viewing a command line, using a graphical and/or other user interface, and entering commands via an input device, such as a mouse, microphone, a keyboard, a touch sensitive screen, a stylus, a track ball, a keypad, etc., and receiving advisory signals via output means such as display means, speaker, LEDs, and so forth. Inputs from the user can be received via an input/output (I/O) subsystem and routed to processor via an internal bus (e.g., system bus) for execution under the control of the operating system. The input/output means for interacting with the system 23 may be embodied within the digital data processing device 64, such as the graphical user interface, display means, a touch screen display, stylus, keypad, keyboard, buttons, a microphone, and a speaker. Alternatively, the reader 34 can be added onto any of the afore-mentioned devices 64 as a peripheral.

In another embodiment, a reader 34 resident on the container 24 includes a network interface for coupling to a digital data processing device 64 or network. The network can include a series of network nodes (e.g., the clients and servers) that can be interconnected by network devices and wired and/or wireless communication lines (e.g., public carrier lines, private lines, satellite lines, etc.) that enable the network nodes to communicate. The transfer of data (e.g., messages) between network nodes can be facilitated by network devices, such as routers, switches, multiplexers, bridges, gateways, etc., that can manipulate and/or route data from an originating node to a server node regardless of dissimilarities in the network topology (e.g., bus, star, token ring), spatial distance (e.g., local, metropolitan, wide area network, internet), transmission technology (e.g., TCP/IP, Systems Network Architecture), data type (e.g., data, voice, video, multimedia), nature of connection (e.g., switched, non-switched, dial-up, dedicated, or virtual), and/or physical link (e.g., optical fiber, coaxial cable, twisted pair, wireless, etc.) between the originating and server network nodes. As an example, the reader 34 may be coupled via a wired or wireless connection, such as Ethernet, IEEE 1394, TDMA, CDMA, GSM, EDGE, PSTN, ATM, ISDN, 802.1X, USB, Parallel, Serial, UART (RS-232C), among others. In this case, the input/output means for interacting with the system 23 are embodied within the digital data processing device, such as the graphical user interface, display means, stylus, keypad, keyboard, buttons, touch screen display, microphone, and speaker.

Alternatively, the reader 34 is a standalone handheld device, or is coupled to a digital data processing device 64 or network. A non-integrated reader 34 may be used with multiple containers 24, so that contact lens case 24 may be disposed of periodically to reduce your risk of infection. Therefore, a non-integrated reader 34 may be more economical than an integrated reader 34, as the non-integrated reader 34 can be easily associated or de-associated with a contact lens container 24 to permit re-use with another container 24, while also maintaining historical data pertaining to the user, contact lens 10 use, and so forth.

Alternatively, the system 23 issues advisory signals, such as reminders, alerts & warnings, to the user and third parties, such as, eye-care practitioners, pharmacy or central server/database via the wired or wireless network. The third parties can issue alerts to the user via any predetermined mode of communication with user, such as telephone, voice-mail, fax, email, SMS, IM, MMS, snail mail, courier, and so forth. Depending on the nature of the advisory signals, the third party may automatically fill a new prescription for replacement lenses 10, 11 and send them to the user, or may seek user intervention before filling the new prescription, in accordance with user-determined lens replacement rules or recall notices. Such advisory signals may also be used for a container 24 with limited display capabilities or a reader 34 coupled to a digital data processing device 64 with limited computing resources.

The third party may also analyze the received data and track the amount of time the lenses 10, 11 are actually worn by the user, and compile reports relating the user data. The third party may thus determine whether the prescription is being followed, for example if dailies are worn for more than 24 hrs, or whether overnights are being worn beyond the prescribed maximum time period, such as 30 days. Using the received data, the third party may recommend a wearing time dependent on the user's individual needs, or recommend another prescription with a different wearing schedule. The reports may also be issued to the user and any other interested parties, such as, insurance companies.

The reader 34, either standalone or attached or integrated in the digital data processing device, may be coupled to another digital data processing device 64 or network to enable a user to order lenses 10, 11, for example, when the lenses 10, 11 are nearing expiration, have expired, or have been damaged. Through the input/output means for interacting with the system 23, a user may place carry out a transaction for the purpose of ordering or purchasing lenses 10,11 from a pharmacy, retailer or virtual store for a replacement lens or pair, based on the data stored on the tag 20. The prescription details, user details, shipping address, eyecare practitioner information, and so forth, are sent to the pharmacy, retailer or online store via a wired or wireless connection to carry out a commercial transaction; and any suitable payment means, such as, credit cards, debit cards, cheque, wire transfer, electronic money, C.O.D., and so forth, may be used to complete the transaction. In one example, the system 23 includes an RFID-NFC enabled mobile device 64, capable of ordering a pair of lenses 10,11. Near Field Communication (NFC) technology, a very short-range radio frequency identification (RFID) protocol that provides secure communications between various devices. By having this relatively short read distance, security is enhanced as this substantially diminishes the possibility of eavesdropping or man-in-the middle attacks. In an NFC-enabled mobile device 64, such as a mobile phone, the reader 34 is powered by the batteries within a mobile phone 56 to allow communication with an NFC tag 20 on a lens 10. Using account information stored in the mobile device 64 the user can automatically place an order to a pharmacy or retailer for a replacement lens 10 or 11 or lens pair 10, 11, based on the data stored on the tag 20, and any other data provided by the user. The reader 34 within the mobile device 64, or wallet phone, automatically connects via the cellular connection or through NFC-enabled Wi-Fi or Bluetooth to the pharmacy, retailer or virtual store to carry out the commercial transaction. Alternatively, the lenses 10, 11 may be ordered automatically by the system 23, or by the pharmacy, retailer or virtual store, upon determination of impending expiry of the lenses 10,11, or in accordance with predetermined lens replacement rules stored in a computer readable medium 50.

In yet another embodiment, communication may be accomplished between the reader 34 and a tag 20 via different media or frequencies for different purposes (e.g., infrared light, or acoustics).

In yet another embodiment, the optical device 10 is an ophthalmic lens for eyeglasses or spectacles comprising an identifying means, wherein the identifying means 20 is operable in at least one of an electrical mode and a magnetic mode to emit data associated with the prescription lens 10. Oftentimes, when a user of the eyeglasses needs to replace the eyeglasses, for any number of reasons, such as, a scratched lens, a broken lens. In some instances, the user may not have a valid prescription handy, so a new eye examination with the eyecare practitioner has to be arranged. The other option may be to test the broken or scratched lenses with complicated instruments. Using the present invention, the prescription data can be readily determined and verified with the user thus foregoing a costly eye-examination or determination of the prescription of existing glasses by complicated instruments. Spectacle lenses are made form two main types of materials—plastic or glass. Plastic lenses are often CR39 or polycarbonate. Glass lenses come in a variety of refractive indexes, designed to minimise the thickness. The types of spectacle lenses include, but are not limited to, single vision lenses, either spherical or with astigmatic correction, bifocal lenses, trifocal lenses, multifocal lenses, progressive lenses, aphakic lenses, photochromic lenses, coated lenses, hi index lenses, toughened lenses, aspheric lenses, polarized lenses, among others.

The optical devices 10 are manufactured using any one of the above noted materials, and may be manufactured in accordance with methods known to those skilled in the art of the specific optic device being produced. For example, if an intraocular lens is to be produced, the same may be manufactured by methods known to those skilled in the art of intraocular lens production. Generally, among the known methods for soft contact lens manufacturing is spin casting, a method by which liquid monomer is injected into a spinning mold to create the desired lens shape, thickness and size. The monomer is distributed along the mold according to the centrifugal force, gravity and surface tension of the liquid. Slower rotations produce smaller diameters, thicker centers, flatter base curves and plus powers. The opposite is true for faster rotations. When the desired parameters are obtained, UV light is used to polymerize the monomer into a solid lens. The lens is then hydrated to its final state. Another method is lathe cutting is where a polymerized soft lens material in the rigid state is lathe cut similar to an RGP lens. After cutting and polishing the lenses, they go through a hydration stage that creates the final soft contact lens. The lens will have a specific water content after hydration, depending on the polymer. Yet another method is cast molding, a method which requires two molds between which liquid lens material is injected, and the lens is kept in a liquid state throughout the manufacturing process. As such, a data carrier 20 can be included with the liquid monomer or the eventual lens at any appropriate point in the manufacturing process, or after the manufacturing process.

In another embodiment, the data carrier 20 includes devices manufactured using printable electronics technology, such as printed RFID ICs, or organic, chipless, polymer-based tags, or made with conductive inks that can store and transmit data. These tags 20 are produced with common commercial printing processes such as flexographic, rotogravure, offset or rotary screen using special inks and materials. A variety of electronic inks with conductive, insulating, or semiconductor qualities, are printed in successive layers on plastic substrates to form electronic circuits including organic field effect transistors (OFETs). The electronic inks may be opaque, or transparent and thus undetectable to the human eye, and are compatible with the particular contact lens material. In an exemplary method of developing and manufacturing complete RFID tags uses ink jet technology used to print silver fluid, or inks containing silver dispersions, with features of less than 20 microns. This technology can precision print 1 picoliter-sized drops of organic and inorganic materials on a large variety of substrates. The printable antenna and the circuit chip may be printed directly onto the suitable contact lens material, such that, at least one antenna and at least one circuit chip is electrically connected to the anterior surface, and/or the opposing posterior surface of the contact lens material. Alternatively, the antenna and the circuit chip may be printed onto a polymer film material, or other suitable carrier material, which is attached to the contact lens. Alternatively, active tags may include printable photovoltaics, or printable batteries. In yet another embodiment, the tag 20 is a magnetic tag, based on nanotechnology and microtechnology. The magnetic tag 20 includes certain materials which possess unique magnetic properties that permit individual items to be precisely identified.

In another embodiment, the orientation of an optical device 10 can be readily determined prior to application. For example, for a contact lens 10, the anterior surface 12 or the posterior surface 14 can be determined based on the response characteristics by the tag 20 to the reader 34, to permit a user to readily determine the eye contacting surface prior to insertion. As an example, the data carrier 20 on the anterior surface 12 has a first unique identifier while the data carrier 22 on the posterior surface 14 has a second unique identifier, such that the reader 34 can distinguish which device 20 or 22 is closest to the reader 34, hence which lens surface 12 or 14, based on the response times or emitted data signal characteristics, from the respective devices 20,22. When the contact lens 10 is properly oriented for insertion, that is, the concave surface or anterior surface 12 of the lens 10 is toward the eye, an confirmatory message is provided to the user, either visually or auditorily. However, should the lens 10 have anterior surface 12 facing outwardly (i.e. it is inverted and its posterior surface 14 is now toward the eye, then a corresponding warning message issued, including any other appropriate actions needed to correct the orientation of the lens 10. The reader 34 with at least one receiver 52 can measure the intensity of the signals from the tags 20, 22 established as base points. The reader processor 48 collects the data from the receiver(s) 52 and determines the location of the tags 20, 22 using algorithms and time-of-arrival (TOA) differentiation of a signal emitted from the tag 20 or 22 to a number of receivers 52, via multilateration, or hyperbolic positioning. It is noted that knowledge of the signal arrival times and signal transmit times generally provides sufficient information for performing interference profiling, tag tracking. Other methods, such as triangulation may be employed. Alternatively, for active tags 20, 22, a tag transmitter 42 located with the lens 10 transmits, at selected intervals, transmissions including at least a unique identifier.

Figure 7:
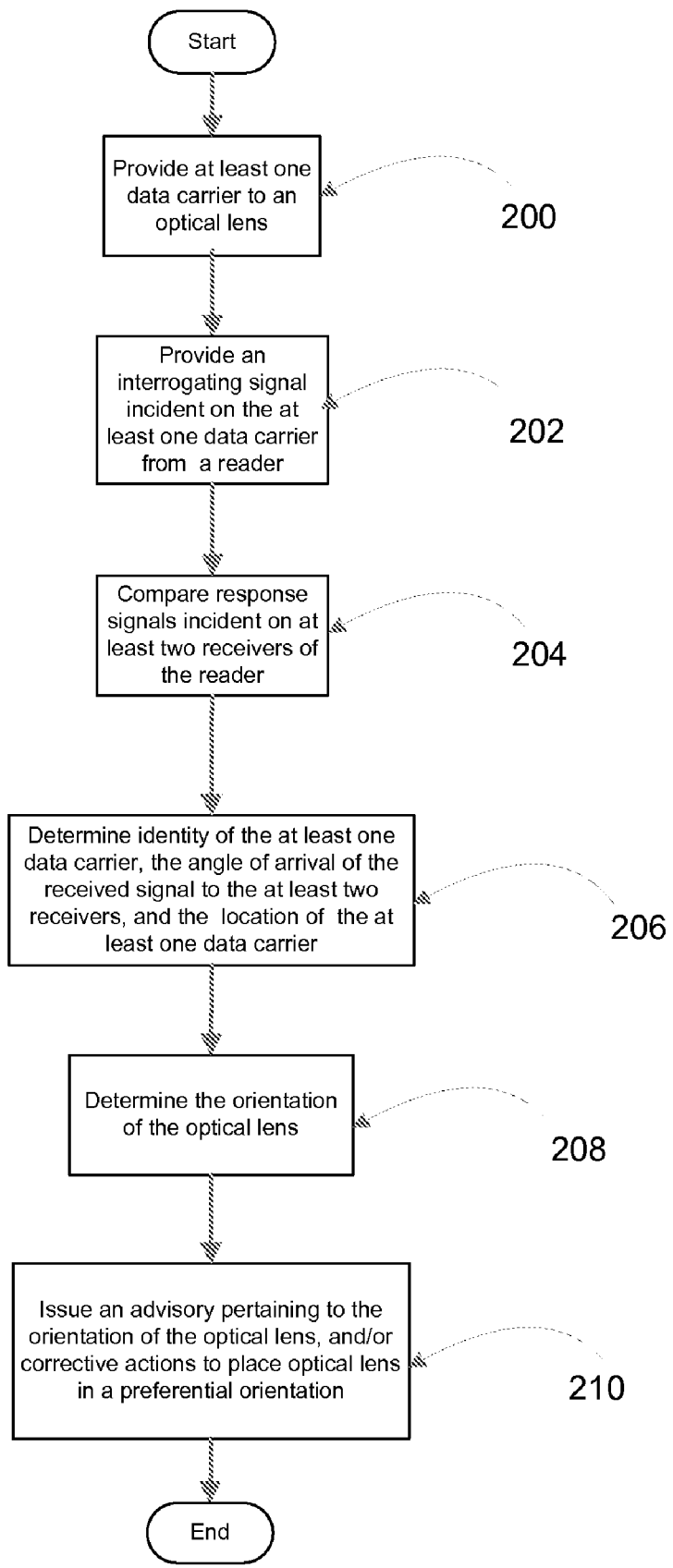
FIG. 7 is a flowchart outlining the steps for determining the orientation of an optical lens.
Figure 8:
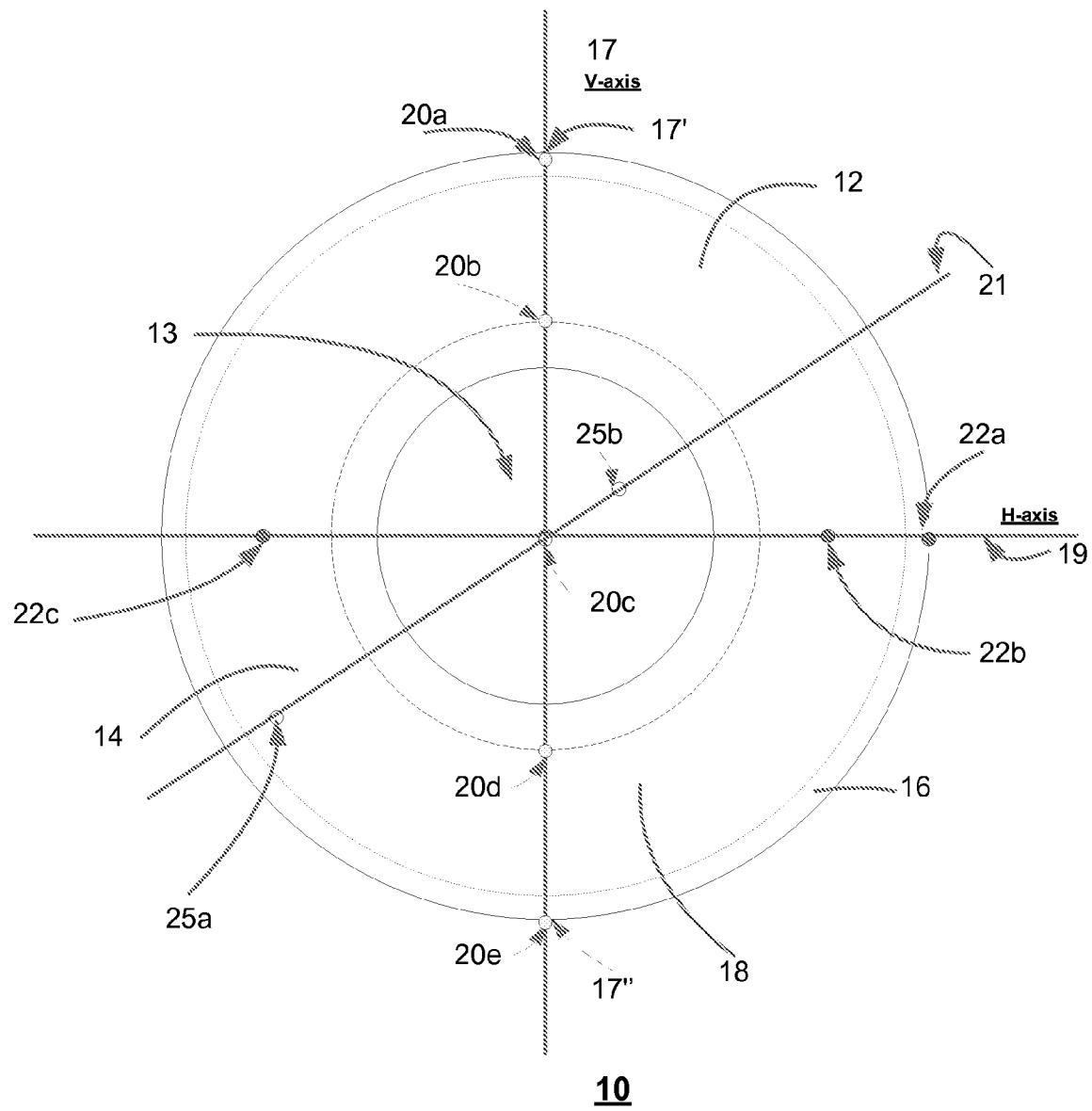
FIG. 8 is a plan view of an optical lens, in another exemplary embodiment of the present invention.

In more detail, as shown in FIG. 7, the method determining the orientation of an optical device 10, such as the contact lens of FIGS. 1 and 8, includes the steps of providing an optical lens 10 with at least one data carrier 20 or 22 for carrying data related to the optical lens 10, the data carrier 20 or 22 being operable in at least one of an electrical mode and a magnetic mode; the data carrier 20 or 22 being included on the anterior surface 12 and/or posterior surface 14, or edge surface (step 200); providing an interrogating signal incident on the data carrier 20 or 22 from a reader 34, to cause the data carrier 20 or 22 to emit a data signal in response to the interrogating signal or causing the data carrier 20 to emit a data signal periodically, or in response to an interrogating signal (step 202); comparing the response data signals incident on at least two receivers 52 of the reader 34; processing the emitted data signals to determine the characteristics the emitted data signals (step 204), the reader 34 may include at least one array of adjacent antennae 54 measuring the range from that array to the data carriers 20, 22, identity of data carriers 20, 22 in the field, range and pointing vector to the tag 20, 22 in a 1D, 2D or 3D space, and also track of movement of data carriers 20, 22 in the reader 34 zone. The array contains at least one transmit antenna 54 for energising the passive data carriers 20, 22, or providing an interrogation signal, and at least one antenna 54 for each receiver 52. Thus, the reader 34 is able to identify the data carriers 20, 22, and also measure the range and direction of those data carriers 20, 22 from the reader antennae 54. By comparing signals arriving at two identical receivers with closely spaced antennae 54 (step 206), the reader 34 is able to determine the angle of arrival of the signals from the tag 20 and hence the direction of that tag 20 from the reader 34, to thus determine the orientation of the lens 10 (step 208), and an appropriate advisory signal follows (step 210).

Alternatively, in step 206 the reader 34 determines the emitted signal intensity by the data carrier 20, or attenuation thereof, whereby the data signal emitted by the device 20 on the anterior surface 12 is distinguishable from the data signal emitted by the device 20 on the posterior surface 14, or whereby the data signal emitted by the device 20 on one surface 12 of the optical device 10 directly in front of the reader 34 is distinguishable from the data signal emitted by a device 20 on the opposing surface 14 of the same optical device 10, such that the attenuation, inherent in the optical device 10 material, to the data signal can be deciphered or detected. Alternatively, at least one surface 12 or 14, or edge surface, of the lens 10 includes more data carriers 20, 22 than the other, such that when interrogated, the data carriers 20, 22 on one surface 12 or 14 will have related signal intensities, more so than the data carriers 20, 22 on the other side. As an example, a predetermined procedure is established as to the placement of the data carriers 20, 22, such as five devices on the anterior surface 12, each with a unique identifier, and two devices on the posterior surface 14, each with a unique identifier. Upon interrogation, there would be a distinction between the signal intensities of the five devices 20, 22 on the anterior surface 12 versus the two devices on the posterior surface 14, and if the signal intensities of the five devices on the anterior surface 12 are greater than those of the two devices on the posterior surface 14, then it follows that anterior surface 12 is closest to the reader 34 (step 208), and the appropriate advisory signal is issued to the user (step 210).

In yet another embodiment, the present invention provides a method and system, and a method of manufacturing thereof, for causing an optical device 10, having an optical power which varies radially and circumferentially about the optic axis of the device 10, to consistently maintain the device 10 in a preferential orientation. For example, a toric lens 10 should be placed in a predetermined orientation upon the eye of a user for proper vision correction. A method of determining a toric contact lens 10 angle of lens rotation on the cornea of a person's eye so that a suitable contact lens 10 can be prescribed or dispensed. A contact lens 10, or trial lens 10, comprising at least one tag 20 or 22 associated with the lens 10, is placed on the eye to be evaluated. At least one tag 20 or 22 is disposed on the lens 10 and along at least one predetermined axis for correlation with at least one axis of the wearer's eye. As an example, as shown in FIG. 8, at least one tag 20*a, b, c*, or *d*, is deposited on the lens surface 12 or 14, attached to the lens 10, or associated with the lens 10. As an example, tag 20*a* is located along the 90th meridian 17 which corresponds to the vertical meridian of the eye of the user, and near the top 17' of that vertical axis 17. As such, for proper orientation the top 17' is intended to be located adjacent the top of the user's eye, whereas tag 20*d* is located along the 90th meridian 17 and near the bottom 17" of that vertical axis 17. As such, for proper orientation the top 17' is intended to be located adjacent the bottom of the user's eye. The lens 10 may include other tags 22*a, b or c* deposited on the lens surface 12 or 14, attached to the lens 10, or associated with the lens 10, along an axis 19 which corresponds to the horizontal meridian 19 of the eye of the user. Alternatively, other tags (not shown) may be located at the edge surface of the lens 10. These tags 20, 22 to assist the user in placing the lens 10 in the eye, and for observing movement of the lens 10 upon the surface of the eye. The presence of eyelids pressing on the toric contact lens 10 and the gravitational pull on the lens 10, especially if it has prism ballast, will cause the lens 10 to rotate on a cornea having astigmatism characteristics, causing the tag 20 or 22 to be at an angle to the horizontal axis 19 or to the vertical axis of the user's eye. As such, the rotation of the lens 10, such as an conventional asymmetric contact lens, within the eye can be measured while the user's head is in a predetermined position by comparison of the position of the at least one data carrier 10 to a predetermined axis of the eye. By so doing, the exact angle of lens rotation is determined so that the correct toric contact lens 10 can be prescribed.

The reader 34 is able to determine the orientation of the lens 10 by the data signals received from the uniquely IDed tags 20, 22, and or with respect to in combination with a reference point. This determination can be done any number of methods, such as those mentioned above, for example, the reader 34 is able to determine the identity and location of the tag 20 or 22 on the lens 10 with respect to the eye, the angle of arrival of the signals from the tag 20 or 22, and hence the direction of that tag 20 or 22 from the reader 34 by comparing signals arriving at two identical receivers 52 with closely spaced antennae 54. Other tags 25*a, b*, may be included at various axes, such as axis 21, or predetermined locations of the lens 10 to aid in correct orientation of the lens 10. The reader 34 thus processes the data from any of the tags 20, 22 or 25 to determine the current orientation of the lens 10 with respect to the user's eye, and provide feedback to the user on how to proceed, such as, how to correct the orientation, or to proceed with insertion when the lens 10 is properly oriented.

In another embodiment, the reader 34, as described above, outputs an image of the lens 10 on a display 56, using the identity, and location of the tags 20, 22 in a 2D or 3-D space. For instance, the tags 20, 22 act as fiducial markers or alignment means, whose precise location on the lens 10 is known, and thus with a sufficient number of strategically placed tags 20, 22, image acquisition or image reconstruction of the lens 10 showing the shape or orientation of the lens 10 is possible. Therefore, the image would show the orientation of the lens 10 with respect to the eye of a user, as an aid to correct the rotation or orientation of the lens 10. Other advisory signals issued by the reader 34 may be visual or auditory.

In another embodiment, the system 23 includes an optical device 10, such as a lens, having at least one alignment means for aligning an optical axis of the lens 10 with a predetermined position of the eye; at least one photographing means for photographing an anterior segment of the eye such that the optical axis of the lens 10 is aligned with the predetermined position of the eye by at least one alignment means; measurement means to obtain measurement data on the eye necessary for vision correction, such as the orientation of the axis of the cylindrical correction, and at least one position-detecting means for processing the image of the anterior eye segment on a display means to detect a position of the pupil, processing the coordinates of the alignment means on the contact lens 10 to detect the position of the contact lens 10 as installed on the eye based on an objective decision. The system 23 may be used for determining the characteristics of an eye in order to determine the correct prescription for a lens 10. As stated above, for an aspherical lens 10, it is necessary to make a visual axis, that is by line of sight a center position of a pupil, correspond with an optical axis of the contact lens 10 so as to obtain adequate fitting of the contact lens 10. As such, the relationship of the positions between the pupil and the contact lens 10 must be determined. In an exemplary system 23, a test contact lens 10, or fitting lens, having a plurality of data carriers 20 at predetermined locations of the lens 10, such as known axes for alignment purposes, is placed on the eye and the anterior eye segment is photographed by a camera. The eye may be photographed while being exposed to light of varying intensities or illuminance, to provide responsive images of the eye showing the pupil, iris and screla, on a display means. The acquired images of eye and the lens 10 may thus be processed, and based on these processed images and the locations of the alignment means or data carriers 20, eye measurements can thus be carried out, for example, the coordinates of the pupil edges, the center position of the pupil edges, or coordinates of the pupil center, and so forth. Therefore, the relationship of relative positions between a contact lens 10 and a pupil is measured quantitatively and precisely. Therefore, it is possible to readily obtain the position of the pupil center relative to the optical axis of the eye-ball position, and/or the lens 10, non-subjectively as with prior art methods, and the rotational angle and displacement, or the like, of the contact lens 10 can be calculated quantitatively, which facilitates determination of the prescription. This provides the practitioner with the ability to observe orientation of the lens 10, and thus the test lens 10 provides a template for a proper lens prescription for that particular measured eye. As such, the practitioner or the lens wearer can use this system 23 to ensure that the actual prescribed lens 10 is properly placed or oriented within the eye according the prescription fitting details, using the advisory signals outputted by the system 23. Also, effective measurements can be made for a contact lens which requires an analysis on a complicated use condition, for example, a contact lens like a custom lens, or a bifocal lens, trifocal lens, multifocal lens, a progressive lens, in which the pupil is covered by a plurality of optical power regions.

In another embodiment, the tag 20 is configured as a read-only tag, programmable write-once/read-many tag, or re-programmable read-many/write-many tag. In general, read-only tags have permanent unalterable code (e.g., identification and/or other data), which is fixed in embedded memory at the time of manufacture. Programmable write-once/read-many tags include embedded memory that can be written to once in the field with the desired information. Re-programmable read-many/write-many tags include embedded memory that can be written to multiple times with the desired information. Since it is impossible to rewrite the data on a write-once/read-many tag, this provides a high level of security and authenticity. Upon purchase of the lens with the passive tag 20, the data, such as, the unique ID, is associated with the prescription details, and other data as described above. Therefore, the unique ID used to perform a lookup in a secure system, and no unique personal information about the user is present within that unique ID. As described above, a reader 34 with a network interface is coupled to a digital data processing device 64 or network to access the data record with the unique ID. Therefore, as an example, the unique ID may be associated with a right lens 10 or a left lens 11, such that the invention can be practiced as described above.

In another embodiment, the container 24 will only accept a known lens 10. For example, the reader 34 reads the lens identification data when the lens 10 is first introduced in the container 24, and stores that lens identification data. The next time a lens 10 or 11 is introduced in that lens container 24, the reader 34 verifies whether the lens 10 or 11 bears predetermined lens identification data, if there is a match then a signal indicative of this outcome is issued. As such, the container 24 may include releasable lock operable in accordance with the identity of the lenses 10, 11, the age or wearable life of the lenses 10, 11 and/or the identity of the user. In one example, following a predetermined number of advisory signals imploring the user to replace the lenses 10,11, or seek a new prescription, the container 24 is locked, and can only be opened after resetting the lock, or by the introduction of a lens 10 with valid prescription data for the particular user. This functionality is useful in a situation where there is more than one container 24 in an environment, such as a household bathroom, changing room or locker room, where there exists a chance a user may choose another user's container 24 by mistake. For health reasons, different users are encouraged not to swap containers 24 to curb spread of infection through the transfer of micro-organisms between lenses 10 or containers 24.

In yet another embodiment, the tag 20 includes a photovoltaic array that acts as both a light signal receiver (extracting data and clock information from the reader) and a means to convert light into electrical power to operate the RFID digital IC chip. The tag 20 responds to a unique signal from the tag reader and when activated, would send information back to the reader 34, via electromagnetic means In yet another embodiment, the system 23 supports various security features that ensure the integrity, confidentiality and privacy of information stored or transmitted, such as: (a) mutual authentication—where the tag 20 can verify that the reader 34 is authentic and can prove its own authenticity to the reader 34 before starting a secure communication session or a secure transaction; (b) strong information security—for complete data protection, information stored on tag 20 can be encrypted and communication between the tag 20 and the reader 34 can be encrypted to prevent eavesdropping. The authentication data of the contact lens 18 is verified with the logic means 48 or external means to help combat counterfeiting. Additional security technologies may also be used to ensure information integrity. Additionally, the tag 20 may include built-in tamper-resistance by employing a variety of hardware and software capabilities that detect and react to tampering attempts and help counter possible attacks. The system 23 may also include the ability to process information and uniquely provide authenticated information access and protect the privacy of personal information. The tag 20 can verify the authority of the information requester 34 and then allow access only to the information required. Access to stored information can also be further protected by a challenge-response scheme, such as a personal identification number (PIN) or biometrics to protect privacy and counter unauthorized access. Other security options include providing only non-confidential information on the tag 20, and using information pointers, rather than actual information, using 'kill commands' to permanently render the tag 20 inoperable by at any point in the life of the lens 20 while protecting against inadvertent or malicious disablement of the tag 20, or using a disguised EPC number, or unique identifier, during transaction to helping protect tag identity and tag data.

In yet another embodiment, the above methods and systems are applicable to the optical devices which are used for a component, or the like, of an optical instrument or information equipment, where identification and/or orientation (installing direction of an optical device, such, back surface or front surface, or side) of the optical device may need to be readily determined prior to installation or use within certain equipment. For some optical applications, the individual optical components must be mounted in a system structure, and the components have certain characteristics, such as, spectral passing band (nm), UV cut-off, optical refractive index, Abbe value, transmittance % or haze (%) for a particular thickness, thermal coefficient of expansion, density, UV cut-off, MIL-code. Such devices may include, but are not limited to, pickup lens of an optical communication disk, an optical communication module, a pickup lens of a laser printer, an optical disk device, camera lens, and a telescope lens, lens for a monocular, binoculars, telescope, spotting scope, magnifier, telescopic gun sight, theodolite, microscope, and camera (photographic lens), among others. The optical devices may be fabricated using a variety of materials including optical glasses, engineered plastics and crystalline materials. Glass material is the most common type because of its excellent optical properties such as high light transmission and environmental stability. Other materials include quartz, sapphire, fused silica, and a wide range of plastics, such as, acrylic (PMMA), polystyrene polycarbonate (optical grade), NAS, polyolefin(Zeonex), Arton F, Optores (OZ1000-1100), Optores (OZ1310-1330), among others, and glass-ceramic materials. Plastic optics can also be combined with glass optics to form hybrid optical systems. Therefore, providing the optical lens with at least one data carrier for carrying data related to the optical lens facilitates acquiring the relevant data. This method and apparatus is particularly beneficial where the devices are relatively small, thus making it difficult to employ prior art methods, such as, engraving, for visual inspection by a user to determine the installation surface. As a further example, the age of the optical devices, such as, resistive touchscreens can be tracked or determined, such that usage in field can be studied, or compared to MTBF ratings, or the age may be used to determine a replacement schedule.

Although a plurality of data carrier means activatable by suitable fields have been specifically disclosed herein, it is to be understood that the present invention is not restricted to these. Any electrically and/or magnetically operable device suitable for the indicated purpose may be employed in embodiments of the present invention. In particular, it is to be understood that the operation of the data carrier means need not be wholly electrical and/or magnetic, and thus for example optical and/or acoustic elements may be employed in conjunction with electrical and/or magnetic devices in alternative embodiments.

It is further to be understood that the invention is not restricted to magnetic and/or electrical fields to be put into practice. Any other type of field (electromagnetic or otherwise) which is suitable to activate a cooperable data carrier means in accordance with the present invention can be employed. Thus, in alternative embodiments of the invention for example fields comprising radiation anywhere within the electromagnetic spectrum may be employed, and also other fields such as acoustic or other non-electromagnetic fields may be employed in suitably adapted embodiments.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The embodiments of the invention in which an exclusive property or privilege is claimed are defined as follows:

1. A method for determining the orientation of an optical device, said optical device having an anterior surface and a posterior surface, said method having the steps of:
providing said optical device with uniquely identifiable data carrier means for carrying data related to said optical device, said data carrier means operable in at least one of an electrical mode and a magnetic mode; said data carrier being deposited on said posterior surface and/or said anterior surface;
providing an activation signal from an external means;
activating said data carrier means with said activation signal to cause said data carrier means to emit a data signal in response to said activating signal;
processing said emitted data signal to determine said characteristics the emitted data signal; whereby said data signal emitted by said data carrier means on said anterior surface is distinguishable from said data signal emitted by said data carrier means on said posterior surface.

2. The method of claim 1 wherein said optical device is chosen from a group consisting of an ophthalmic lens, a contact lens, intra-ocular lens, lens for eyeglasses, an optical lens, a monocular lens, binoculars lens, a trial lens, a test lens, a fitting lens, a telescope lens, a spotting scope lens, a telescopic gun sight lens, a theodolite lens, a microscope lens, a camera lens, an imaging lens, a CCD/CMOS lens, a custom lens, a medical device lens, a lens for automotive applications, an optical filter, a cut-off filter, an optical low-pass filter, a window, an optical window, a diffuser, a plate, a prism, a prism mirror, a mirror, optical glass, strip form, blanks or fine gobs, a glass substrate, a glass-ceramic substrates, a TS-10 glass-ceramic substrate, a LCOS prism or lens, a beam splitter, an astronomical optical component, an optical component for illumination systems, an optical component educational optics, a magnifier lens, an optical component for spectroscopic applications, and an optical component for a medical apparatus or medical system.

3. The method of claim 2 wherein said data carrier means includes any of the following, an RFID tag, a magnetic tag, device manufactured using printable electronics technology, an organic tag, a chipless tag, and a polymer-based tag.

4. The method of claim 3 wherein said external means comprises a second device for emitting said activating signal in an electric and/or magnetic mode, said second device including a transmitter and/or receiver, wherein said second device is included with any of the following: an optical lens container, a mobile device, a handheld device, a digital data processing device, a standalone transceiver, a standalone transceiver coupled to a network, a standalone transceiver coupled to a digital data processing device.

5. The method of claim 4 wherein said data comprises any of the following: SKU, unique ID, manufacturer, logo, material of manufacture, composition, lot. no., batch no., warehouse related data; promotional material (rebate for next pair purchase or free trials), optical device features lens features and description, lens benefits data, health warnings, data on potential risk or complications, insurance coverage data, regulatory data, authenticity data, fitting details, orientation of optical device (inside-out or right side-out), optical device type data, optical device care or handling information, indications, recommended usage information such as wear schedule, filling pharmacy, health professional information, time, an optical device user's personal details, prescription information, right eye/left eye identification data, expiration data, URI., spectral passing band (nm), UV cut-off, optical refractive index, Abbe value, transmittance % or haze (%) for a particular thickness.

6. The method of claim 5 wherein said external means issues an advisory signal associated with the emitted data signal characteristics of said data carrier means.

7. The method of claim 6 wherein said advisory signal is provided visually or auditorily.

8. A method for determining the orientation of an optical device, said optical device having an anterior surface and a posterior surface, the method having the steps of:
providing said optical device with uniquely identifiable data carrier means for carrying data related to said optical device, said data carrier means operable in at least one of an electrical mode and a magnetic mode; said data carrier means being deposited on said posterior surface and/or said anterior surface;
said data carrier means being caused to emit a data signal; processing said emitted data signal to determine the characteristics of said emitted data signal; whereby said data signal emitted by said data carrier means on said anterior surface is distinguishable from said data signal emitted by said data carrier means on said posterior surface.

9. The method of claim 8 wherein said optical device is chosen from a group consisting of an ophthalmic lens, a contact lens, intra-ocular lens, lens for eyeglasses, an optical lens, a monocular lens, a trial lens, a test lens, a fitting lens, binoculars lens, a telescope lens, a spotting scope lens, a telescopic gun sight lens, a theodolite lens, amicroscope lens, a camera lens, an imaging lens, a CCD/CMOS lens, a custom lens, a medical device lens, a lens for automotive applications, an optical filter, a cut-off filter, an optical low-pass filter, a window, an optical window, a diffuser, a plate, a prism, a prism mirror, a mirror, optical glass, strip form, blanks or fine gobs, a glass substrate, a glass-ceramic substrates, a TS-10 glass-ceramic substrate, a LCOS prism or lens, a beam splitter, an astronomical optical component, an optical component for illumination systems, an optical component educational optics, a magnifier lens, an optical component for spectroscopic applications, and an optical component for a medical apparatus or medical system.

10. The method of claim 9 wherein said data comprises any of the following: SKU, unique ID, manufacturer, logo, material of manufacture, composition, lot. no., batch no., warehouse related data; promotional material (rebate for next pair purchase or free trials), optical device features and description, optical device benefits data, health warnings, data on potential risk or complications, insurance coverage data, regulatory data, authenticity data, fitting details, orientation of optical device (inside-out or right side-out), optical device type data, optical device care or handling information, indications, recommended usage information such as wear schedule, filling pharmacy, health professional information, time, an optical device user's personal details, prescription information, right eye/left eye identification data, expiration data, URI., spectral passing band (nm), UV cut-off, optical refractive index, Abbe value, transmittance % or haze (%) for a particular thickness.

11. The method of claim 10 wherein said data carrier means is caused to emit a data signal in response to an activating signal from an external means.

12. The method of claim 10 wherein said data carrier means emits a data signal in response to an interrogating signal from an external means.

13. The method of claim 10 wherein said data carrier means emits a data signal periodically.

14. The method of claim 10 wherein said data carrier means emits a data signal periodically in response to an interrogating signal.

* * * * *